United States Patent [19]

Bush et al.

[11] Patent Number: 4,506,048

[45] Date of Patent: Mar. 19, 1985

[54] AGENTS FOR PREPARING CROSS-LINKED POLYMERS AND PAINT AND PLASTIC COMPOSITIONS CONTAINING THOSE AGENTS

[75] Inventors: Rodney D. Bush, Cincinnati, Ohio; Medford D. Robbins, Whitewater Township, Franklin County, Ind.

[73] Assignee: The Procter & Gamble Company, Cincinnati, Ohio

[21] Appl. No.: 547,284

[22] Filed: Oct. 31, 1983

Related U.S. Application Data

[62] Division of Ser. No. 290,918, Aug. 7, 1981, Pat. No. 4,427,835.

[51] Int. Cl.³ .............................................. C08K 5/34
[52] U.S. Cl. .................................... 524/100; 523/402; 523/423; 525/293; 525/301; 525/304; 525/308; 528/365; 528/366; 524/533
[58] Field of Search ............... 523/423, 402; 524/100, 524/533; 525/301, 304, 308, 293; 528/365, 366

[56] References Cited

U.S. PATENT DOCUMENTS

| | | |
|---|---|---|
| 2,320,924 | 6/1943 | Gift . |
| 2,916,469 | 12/1959 | Lal . |
| 3,317,634 | 5/1967 | Longworth . |
| 3,321,430 | 5/1967 | Ott et al. ............................ 523/423 |
| 4,118,436 | 10/1978 | Craven . |
| 4,133,793 | 1/1979 | Lewis . |
| 4,151,131 | 4/1979 | Sekmukas et al. ................... 523/423 |
| 4,166,054 | 8/1979 | Meeske et al. ...................... 523/423 |
| 4,242,243 | 12/1980 | Antonelli . |
| 4,244,850 | 1/1981 | Mylonakis . |
| 4,261,872 | 4/1981 | Emmons . |
| 4,266,752 | 10/1980 | Erickson . |
| 4,309,330 | 1/1982 | Ukita et al. . |
| 4,310,644 | 1/1982 | Miley . |

FOREIGN PATENT DOCUMENTS

| | | |
|---|---|---|
| 1148033 | 5/1963 | Fed. Rep. of Germany . |
| 916563 | 1/1963 | United Kingdom . |

OTHER PUBLICATIONS

Hochberg, J. Oil and Colour Chemists Assoc., 48, 1043–1068 (1965).
Akashi, Kogyo Kagaku Zasshi, 66:153–156 (1963).
Prane, Polymer News, 4, 239–241 (1978).
Imoto, et al., J. Poly, Sci. 17, 385–392 (1979).

Primary Examiner—Joseph L. Schofer
Assistant Examiner—Bernard Lipman
Attorney, Agent, or Firm—Steven J. Goldstein; Jack D. Schaeffer; Richard C. Witte

[57] ABSTRACT

A class of polymer precursor materials, which, under appropriate conditions, react to form cross-linked polymers, is disclosed. These materials contain a backbone segment, such as polyacrylate, having pendant therefrom mono- or disubstituted olefinic groups, such as vinyl itaconate, having specific polymerization rates. This class of materials, especially when coupled with specifically-defined oxygen-activated catalyst systems, provide paint and plastic compositions which exhibit excellent film formation, strength and durability characteristics.

35 Claims, No Drawings

AGENTS FOR PREPARING CROSS-LINKED POLYMERS AND PAINT AND PLASTIC COMPOSITIONS CONTAINING THOSE AGENTS

This is a division of application Ser. No. 290,918, filed Aug. 7, 1981, now U.S. Pat. No. 4,427,835.

TECHNICAL FIELD

The present invention relates to paint and plastic compositions utilizing cross-linked polymer films and the polymer precursor materials used in forming those films.

BACKGROUND OF THE INVENTION

Objects tend to be particularly vulnerable to wear and tear at their surfaces. The surfaces of objects left in the open bear the brunt of the sun, rain, fog, dew, ice and snow. Under these conditions iron rusts, wood rots and road surfaces crack and disintegrate, just to name a few of the possible consequences. Even sheltered objects, such as those found in the home, suffer the wear of daily use: scratches, dents and abrasions, at their surfaces. To prevent or to minimize such damage, coatings designed to protect surfaces are frequently applied. Coatings can also be used to decorate articles: to add color, luster, or to smooth out roughness or irregularities caused in the manufacturing process. Thus, in selecting a surface coating for a particular object there is a constant balancing which must go on between providing the necessary and appropriate protection and decoration functions. A wide variety of surface coatings is available, e.g., wallpaper, plastic sheets, chrome and silver plating. However, one of the most economical and versatile coatings is paint, which can be applied to any surface, however awkward its size or shape, by one process or another.

Most paints contain liquid resinous or polymeric materials, known as binders. It is this component which, after conversion to a solid through the paint's drying process, provides a surface film having the necessary attributes of adhesion, flexibility, toughness and durability. Paints can generally be subdivided into two broad categories: convertible and non-convertible coatings. A convertible coating is a paint in which the binder is either a polymer precursor, a monomer or a partially polymerized material. Upon addition of a suitable initiator or exposure to radiant energy, such as ultraviolet or infrared radiation, the monomeric or partially polymerized component on the paint undergoes a polymerization reaction in which the binder is converted from a liquid or a soluble state into an insoluble solid material film. Nonconvertible coatings, in contrast, do not undergo curing or chemical conversion reactions when they dry. For these paints, film formation involves loss or evaporation of a volatile solvent or dispersion medium and the concomitant deposition of the solid binder material; it is critical that this deposition be both uniform and continuous. See Boxall, et al., *Concise Paint Technology*, Chemical Publishing, New York, 1977, especially pages 29-57; and Turner, *Introduction to Paint Chemistry*, Chapman and Hall Ltd., 1967, especially pages 95-107.

BACKGROUND ART

Polymerization reactions involving simple monomers, i.e., vinyl cyclic acetals, in the presence of oxygen and cobalt salts, to produce polymeric materials are well-known in the art. See, for example, Hochberg, *J. Oil and Colour Chemists Assoc.*, 48, 1043-1068 (1965) and U.S. Pat. No. 3,190,878, issued June 27, 1965, British Specification No. 916,563, published Jan. 23, 1963, and German Specification No. 1,148,033, published May 2, 1963, all assigned to E. I. duPont de Nemours & Co. The reaction of itaconic acid with vinyl acetate to form polyvinyl itaconate is also known. Akashi, *Kogyo Kagaku Zasshi*, 66, 156 (1963). Polymerization reactions of acrylic-terminated oligomers, initiated through the use of ultraviolet light, have been disclosed. Prane, *Polymer News*, 4, 239-241 (1978). The use of benzaldehyde, in the absence of oxygen, as an initiator for the free radical polymerization of methyl methacrylate has been disclosed. Imoto, et al., *J. Poly. Sci.*, 17, 385-392 (1979).

U.S. Pat. No. 4,244,850, Mylonakis, issued Jan. 13, 1981, describes a paint composition containing preformed aqueous emulsion acrylate copolymer particles to which have been attached ethylenically unsaturated side chains. The acrylate copolymer, formed by emulsion polymerization, is made from butyl acrylate, methyl methacrylate and methacrylic acid. The unsaturated side chain is attached to the preformed particles in the emulsion via a post reaction of the free carboxylic acid groups with glycidyl methacrylate.

In formulating a paint, especially an interior wall paint, the key characteristics to be kept in mind, in addition to aesthetics, are convenience of use, durability and ease with which the painted surface may be cared for. Further, when formulating a solvent-based paint, it is desirable to have a high solids content. Paints with low solids content have increased amounts of solvent; this is generally considered undesirable by consumers since ultimately the solvent just evaporates off. The paint should have excellent hiding properties (one-coat hiding is best); it should form a film which is stain resistant and easy to clean; it should have a high degree of surface continuity; and, finally, it should be durable, strong and resistant to wear.

It has now been found that by using the new polymer precursor materials of the present invention, especially in combination with the specifically-defined oxygen-activated catalysts herein, paint compositions exhibiting outstanding surface continuity, hiding power, stain resistance and durability may be formulated. Further, the polymer precursor materials may be used in formulating plastic compositions, especially useful in forming reaction injection molded articles, which exhibit very high mechanical strength.

SUMMARY OF THE INVENTION

The present invention relates to an agent for preparing cross-linked polymers (i.e., polymer precursor materials, also known as resins or film-forming agents) comprising:

(a) a major portion of a polymer selected from the group consisting of polyacrylates, polymethacrylates, polyesters, polyurethanes, polycarbonates, polyepoxides, polyvinyls, polystyrenes, or mixtures thereof (with polyacrylates being preferred), having a molecular weight of from about 1,000 to about 10,000, this portion constituting the backbone of said agent; and (b) a minor portion of mono- or disubstituted olefinic groups pendant from said backbone, with the olefinic substituents on the groups being unpolymerized, said groups (preferably vinyl or allyl itaconate) having a polymerization rate constant between about $10\times10^{-4}$ and $1000\times10^{-4}$, preferably between about $10\times10^{-4}$ and about $600\times10^{-4}$, moles$^{-\frac{1}{2}}$ liter$^{\frac{1}{2}}$ minute$^{-1}$ at 70° C.

These agents when used in the presence of appropriate initiators, undergo a free radical polymerization reaction forming cross-linked polymers. Also included within the scope of the present invention are paint compositions utilizing these polymer precursor materials, comprising:

(a) from about 10% to about 60%, by weight, of solid pigment particles;

(b) from about 15% to about 60%, by weight, of a film-forming agent as described above;

(c) an amount of an oxidative catalyst sufficient to cross-link from about 2% to about 60% of the pendant groups of said film-forming agent within about 48 hours upon exposure to air at a temperature of 20° C.; and (d) a solvent for said film-forming agent.

Finally, the present invention encompasses plastic compositions which comprise from about 20% to about 99% of the film-forming agents, defined above, or the cross-linked polymers formed from those agents.

The preferred oxidative catalysts for use in the present invention consist essentially of mixtures of peroxide-decomposing transition metal catalysts, such as a cobalt (II) compound, together with hydrocarbon compounds selected from the group consisting of

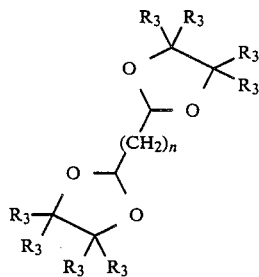

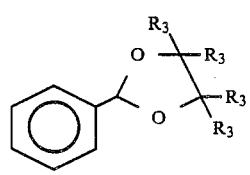

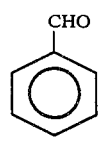

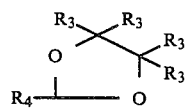

-continued

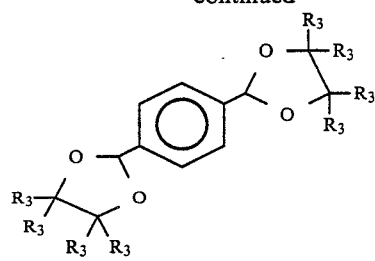

and mixtures thereof, wherein each $R_3$ is hydrogen, methyl, phenyl or COOH; $R_4$ is $C_1$-$C_{20}$ alkyl or alkenyl; and n is from 1 to 10.

DETAILED DESCRIPTION OF THE INVENTION

Polymer Precursor Materials

The essence of the present invention resides in a class of agents for preparing cross-linked polymers; these agents, when reacted under appropriate conditions, undergo a cross-linking polymerization reaction forming a strong, durable polymeric film which is the basis of the paint and plastic compositions defined herein.

These agents are made up of two components: a major proportion of a low molecular weight backbone, and a minor proportion of mono- or disubstituted olefinic groups pendant from that backbone. It is preferred that the ratio, by weight, of pendant groups to backbone is from about 0.05:1 to about 1:1, most preferably from about 0.1:1 to about 0.5:1. The backbone segment of the agent is selected from the group consisting of polyacrylates, polymethacrylates, polyesters, polyurethanes, polycarbonates, polyepoxides, polyvinyls, polystyrenes, or mixtures thereof, having a molecular weight of from about 1,000 to about 10,000; the preferred backbones for agents of the present invention being polycarbonates and, especially, polyacrylates. The precise backbone structure to be used in a particular application is chosen based on the mechanical strength, environmental resistance, and facility to perform post-oligomer chemistry (i.e., the ability to attach functional groups) required.

Examples of such backbone materials and procedures for synthesizing them are disclosed in Boxall, et al., *Concise Paint Technology*, Chemical Publishing Co., Inc. New York, 1977, pages 29–57, incorporated herein by reference. Thus, for example, acrylic resins are polyvinylidene compounds having the general formula

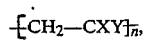

wherein X commonly may be H, $CH_3$, $C_2H_5$, and Y is usually COOH or $COOCH_3$. Epoxy resins are cross-linked polymers derived from reactions involving the epoxide or oxirane grouping

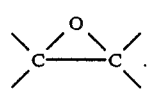

Epoxy resins may be produced by the reaction of bisphenol and epichlorhydrin. Polyurethane resins are polymers containing the urethane group,

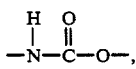

within the main polymer backbone; they are formed by the reaction of isocyanates, R—NCO, with hydroxyl compounds. Preferred polycarbonates have the structure:

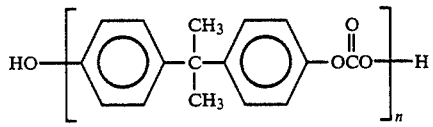

The pendant groups are mono- or di-substituted olefinic groups, with the olefinic substituents being unpolymerized. To be useful in the present invention, the pendant groups should be susceptible to free radical polymerization and polymerize at an acceptable rate, upon appropriate initiation, at room temperature in an oxygen atmosphere. Preferred pendant groups have a polymerization rate constant (measured at 70° C.) between about $10 \times 10^{-4}$ and about $1000 \times 10^{-4}$, especially between about $10 \times 10^{-4}$ and about $600 \times 10^{-4}$, more preferably from about $60 \times 10^{-4}$ to about $600 \times 10^{-4}$, moles$^{-\frac{1}{2}}$ liter$^{\frac{1}{2}}$ minute$^{-1}$. Particularly preferred pendant groups are those selected from the group consisting of mono-methyl itaconate, 4-allyl-2-methylenesuccinate(beta-allyl itaconate), 1-vinyl-2-methylenesuccinate(alpha-vinyl itaconate), p-vinylbenzoic acid, monovinyl maleate, methyl methacrylate, 4-vinyl-2-methylenesuccinate(beta-vinyl itaconate), N-phenyl-2-methylenesuccinimide, substituted N-phenyl-2-methylenesuccinimides and mixtures thereof; vinyl and allyl itaconates, especially alpha-vinyl, beta-vinyl and beta-allyl itaconates, are particularly preferred pendant groups.

The polymerization rate constant ($K'$) of a specific monomer or, as used herein, pendant group is equal to the rate of disappearance of the particular monomer (rate) divided by the product of the initial concentration of that monomer in solution (M) and the square root of the concentration of azobisisobutylnitrile (AIBN) in the system being tested.

$$K' = \frac{\text{rate}}{[M][AIBN]^{\frac{1}{2}}} \quad (1)$$

The rate is determined by heating a solution of monomer (pendant group) and AIBN at 70° C. and determining the change in concentration of monomer with time (mole/liter minute), using chlorobenzene as the solvent under an argon atmosphere. $K'$ is usually determined with monomer concentrations in the range of from about 0.02 to about 2 mole/liter, while the concentration of AIBN is about 10 mole percent of the monomer concentration. For example, the polymerization rate constant for dimethyl itaconate was determined in the following manner. A chlorobenzene solution containing 2.23 mole/liter dimethyl itaconate, 0.23 mole/liter azobisisobutylnitrile, and 2.0 mole/liter dimethyl adipate (internal standard for gas chromatographic analysis) was subjected to three freeze-pump-thaw cycles, using liquid nitrogen to cool the sample and argon as the inert gas. After all the air had been replaced with argon, the reaction solution was placed in a bath at 70.0° C. and the disappearance of dimethyl itaconate was followed by gas chromatography until 20% of the dimethyl itaconate had polymerized. A plot of time vs. concentration of dimethyl itaconate yielded the rate data: rate (in mole/liter minute) is the slope of the plot. $K'$ can then be calculated using equation (1).

The following table illustrates the polymerization rate constants of a range of pendant groups; some falling inside and some falling outside the scope of the present invention.

| POLYMERIZATION RATE CONSTANTS OF PENDANT GROUPS (AT 70° C.) | |
|---|---|
| | ($\times 10^4$ mole$^{-\frac{1}{2}}$ liter$^{\frac{1}{2}}$ minute$^{-1}$) |
| Alpha-allyl itaconate | 24 |
| vinyl succinate | 26 |
| beta-allyl itaconate | 34 |
| allyl maleate | 35 |
| dimethyl itaconate | 38 |
| vinyl octanoate | 54 |
| mono-methyl itaconate | 107 |
| alpha-vinyl itaconate | 111 |
| p-vinylbenzoic acid | 113 |
| vinyl maleate | 114 |
| methyl methacrylate | 173 |
| phenyl alpha-methylenesuccinimide | 495 |
| beta-vinyl itaconate | 563 |
| vinyl chloride | 8,480 |
| vinyl acetate | 8,608 |
| methyl acrylate | 18,944 |

Materials with polymerization rate constants below the defined range polymerize too slowly to be practical for use in paint or plastic compositions, while the materials with higher polymerization rate constants (e.g., methyl acrylate, vinyl chloride, and vinyl acetate) polymerize in a rapid and uncontrolled manner, making their use unfeasible.

Preferred agents of the present invention (i.e., those having a polyacrylate backbone and vinyl itaconate or allyl itaconate pendant groups) have the formulae

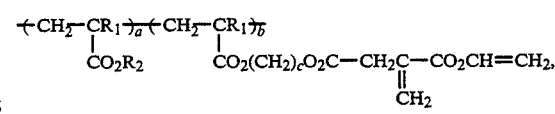

and

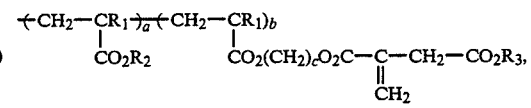

wherein $R_1$ is hydrogen or methyl; $R_2$ is hydrogen or an alkyl substituent; $R_3$ is vinyl or allyl; a is from about 10 to about 100; b is from about 0.1a to about a; and c is from about 1 to about 20. Most preferred agents are those having the formulae

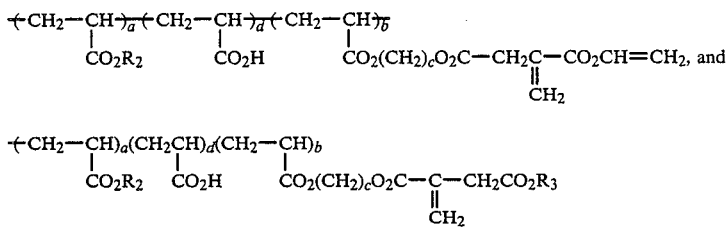

wherein $R_2$ is $C_1$-$C_5$ alkyl; $R_3$ is vinyl or allyl; a is from about 10 to about 100, preferably from about 16 to about 48; b is from about 0.1a to about a, preferably from about 6 to about 12; c is from about 1 to about 5; and d is from about 0.3b to about 0.5b, preferably from about 2 to about 6. Preferred beta-vinyl itaconate pendant groups are described in concurrently-filed U.S. patent application Ser. No. 290,907, filed 8/7/81 now U.S. Pat. No. 4,400,531, Bush, "4-vinyl-2-methylene-butanedioic Acid Compounds", incorporated herein by reference.

The agents of the present invention may be prepared, using conventional methods, for example, in the following manner:

A reaction flask is continually flushed with inert gas (e.g., argon) and charged with the following ingredients: the backbone resin, the acid chloride of the olefinic pendant group, and ethyl acetate. To this solution is added dropwise, with vigorous stirring, an ethyl acetate solution of an organic base capable of taking up the liberated HCl and also of catalyzing the reaction. Insoluble inorganic bases, such as calcium carbonate or ion exchange resins, can be used instead of the organic base, but they additionally require a base catalyst, such as pyridine or triethylamine. Where an inorganic base is used, the olefinic pendant group is added dropwise to a well-stirred dispersion of the insoluble base, the backbone resin and the base catalyst in ethyl acetate. After the base addition is complete, the reaction is worked up immediately in the following manner: the reaction mixture is filtered to remove precipitated amine hydrochloride, washed with saturated sodium bicarbonate to remove any unreacted acid chloride pendant groups of free HCl, and concentrated to remove the ethyl acetate solvent.

Catalysts

The polymer precursor materials of the present invention are usefully combined with catalyst materials (i.e., latent radical initiators) which, when initiated in an appropriate manner, as by introduction of oxygen, ultraviolet radiation, heat or light into the system, cause the precursor materials to undergo free radical polymerization forming a cross-linked polymer film. Although any type of catalyst effective in a free radical polymerization reaction may be used, when formulating paint compositions, it is especially preferred to combine the polymer precursor materials of the present invention with a catalytic amount of an oxidative catalyst sufficient to cross-link from about 2% to about 60%, preferably at least about 10%, most preferably at least about 20% of the pendant groups of the precursor within about 48 hours upon exposure to air at a temperature of about 20° C. Compositions comprising the precursor materials and such oxidative catalysts generally contain from about 0.5% to about 5%, by weight, of the catalyst.

An especially preferred catalyst for use in the present invention is a two-component system consisting of: (a) a specifically-defined hydrocarbon component and (b) a peroxide-decomposing transition metal catalyst. In order for a hydrocarbon to function effectively in such catalyst systems, it first has to be capable of autoxidation to form a hydroperoxide. In a hydrocarbon $R_1R_2R_3CH$, the selection of substituents, $R_1$, $R_2$ and $R_3$ so as to lower the dissociation energy of the carbon-hydrogen bond will be essential to performance in the catalyst system; thus hydrocarbons which readily autoxidize are most useful in the catalysts of the present invention. However, it is not only sufficient to have a hydrocarbon which autoxidizes rapidly, but it is also essential that the intermediate hydroperoxide formed decompose homolytically at a rate faster than it is being formed. The hydrocarbon component is most preferably selected from the group consisting of

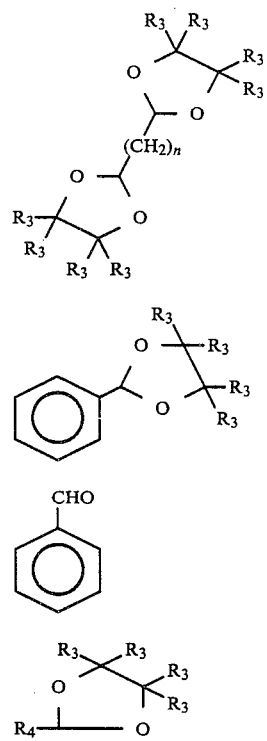

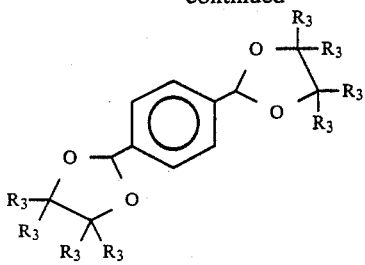

and mixtures thereof, wherein each $R_3$ is hydrogen, methyl, phenyl or COOH; $R_4$ is $C_1$–$C_{20}$ alkyl or alkenyl; and n is from 1 to 10. The aromatic groups may be substituted; however, replacement of the oxygens with nitrogen atoms will significantly reduce the efficacy of these catalyst systems. Preferred hydrocarbon components are those having the formulae:

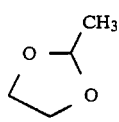

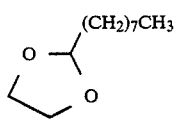

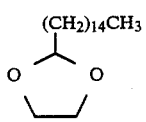

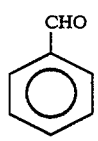

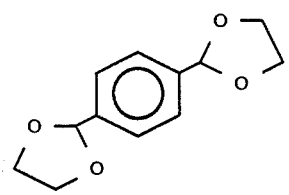

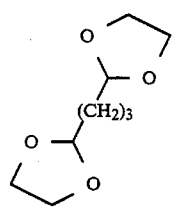

1,3-bis(1,3-dioxolan-2-yl)propane and mixtures thereof. A preferred class of hydrocarbon components is the 2-alkyl substituted 1,3-dioxolanes, with 1,3-bis(1,3-dioxolan-2-yl)propane being especially preferred.

The peroxide-decomposing transition metal catalyst component is preferably a cobalt(II) compound. Such compounds are well-known in the art and most frequently are cobalt(II) salts of carboxylic acids or a 2,4-pentanedione complex of cobalt(II). Examples of such compounds include cobalt(II) dipivalolylmethane, cobalt(II) acetylacetonate, cobalt(II) acetate, cobalt(II) decanoate, cobalt(II) naphthenate, and mixtures thereof. In forming these preferred catalysts for use in the present invention the mole ratio of hydrocarbon component to transition metal catalyst (cobalt(II) compound) is from about 5 to about 5,000, most preferably from about 10 to about 1,000. These preferred catalyst systems are described and claimed in concurrently-filed U.S. patent application Ser. No. 290,908, filed 8/7/81 now U.S. Pat. No. 4,395,361 Eickhoff and Robbins, "Method of Catalyzing Oxygen-Initiated Free-Radical Polymerization and Catalysts Used Therein", incorporated herein by reference.

Although the catalysts, defined above, are particularly useful in combination with the precursor materials of the present application, they have a more general use in catalyzing oxygen-initiated free radical polymerization reactions using any suitable precursor materials. In fact, these catalysts provide a generalized method for catalyzing oxygen-initiated free radical polymerization reactions wherein a resin material capable of free radical polymerization is exposed to oxygen in the presence of an effective amount of the catalyst consisting essentially of: (a) hydrocarbon catalyst compound, as defined above, and (b) a peroxide-decomposing transition metal compound, as defined above, especially a cobalt(II) compound. In such a polymerization reaction the ratio, by weight, of resin to catalyst (i.e., the combination of hydrocarbon and transition metal compound) is from about 5:1 to about 200:1. As used above, the phrase "effective amount" indicates an amount of catalyst material used to effectively catalyze the cross-linking polymerization reaction. For any given reaction, the precise amount of catalyst required will be dependent upon the reaction conditions, the particular resins to be used, and the speed and completeness of the reaction desired; this amount for any given set of reaction materials and conditions is easily determined by one skilled in the art.

The catalyst system, as defined above, may additionally contain a storage stabilizer component. Storage stabilizers (i.e., a polymerization inhibitor) act to assure that the free radical polymerization will not occur until the resin and catalyst mixtures have been exposed to oxygen or another appropriate initiator; however, they should not interfere with the operation of the catalyst system when polymerization is desired. Such storage stabilizers generally act by scavenging and tying up any itinerant free radicals which may be present in the system. Thus, for example, in formulating a paint composition of the present invention, the resin, the catalyst and a storage stabilizer are all included in the containers of paint; this assures that the polymerization will not take place until the paint is applied to a surface and exposed to oxygen. A particularly useful storage stabilizer is tetraphenylverdazyl, having the formula

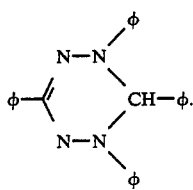

Useful stabilizers also include tetraphenylverdazyl derivatives wherein one or more of the phenyl groups are replaced by substituted phenyl or $C_1$–$C_{10}$ alkyl groups. Another group of useful stabilizers is the low molecular weight oximes disclosed in U.S. Pat. No. 4,261,872, Eammons, et al., issued Apr. 14, 1981, incorporated herein by reference. Such stabilizers may be combined with the catalysts, as defined above, to form a stabilized oxidation catalyst system. When used in this way, such stabilized systems generally contain from about 0.05% to about 20%, preferably from about 1% to about 15%, of the storage stabilizer and from about 99.95% to about 80%, preferably from about 85% to about 99%, of the oxidation catalyst. Such stabilized oxidation catalysts may also be combined with the resin of the present invention to form compositions which are stable upon storage in an oxygen-free environment but which undergo a controlled free radical polymerization reaction upon exposure to oxygen. Such compositions generally contain from about 80% to about 99% of the resin component, from about 0.005% to about 2% of the storage stabilizer component, and from about 0.05% to about 5% of the oxidative catalyst.

Paint Compositions

The polymer precursor materials described in the present application are especially adapted for use in formulating paint compositions. The compositions are applied to the surface, where the polymer precursor materials polymerize in situ, forming the paint film. Thus, the key is to use a polymer precursor which will polymerize in situ, upon appropriate initiation, in an oxygen atmosphere at room temperature. The particular polymer precursor (e.g., the nature and amount of its pendant groups), initiator or storage stabilizer selected will affect the speed and completeness of the in situ polymerization. These paint compositions exhibit outstanding aesthetic and performance properties, including volume efficiency (solids content as high as 85 to 90%, as compared with 25 to 50% for commonly-used paints), high levels of surface continuity, stain resistance, and durability, as well as strength and resistance to wear. The paints may be formulated either as emulsion-based or as solvent-based compositions.

In an emulsion-based paint, the resin is in the form of small discrete droplets dispersed in an aqueous phase. Examples of suitable emulsifying agents include, but are not limited to, alkanolamides, amine oxides, alkyl sulfonates, alkylbenzene sulfonates, ethoxylated alcohols, ethoxylated fatty acids, ethoxylated alkyl phenols, ethoxylated and propoxylated amines, ethoxylate and propoxylate block copolymers, glycerol esters, glycol esters, lanolin-based derivatives, lecithin derivatives, olefin sulfonates, quaternary ammonium surfactants, ethoxylated sorbitan esters, ethoxylated alcohol sulfates, ethoxylated alkylphenol sulfates or phosphates, alcohol sulfates, fatty acid ester sulfonates, alkylammonio acetates, alkylammonio hexanoates, alkylammonio propane sulfonates, and fatty acid sulfates. An emulsion-based paint composition comprises:

(a) from about 10% to about 60%, preferably from about 15% to about 50%, by weight, of solid pigment particles;

(b) from about 15% to about 60%, preferably from about 20% to about 55%, by weight, of the film-forming agents described above;

(c) an amount, preferably from about 0.1% to about 10%, of an oxidative catalyst sufficient to cross-link from about 2% to about 60% of the pendant groups of said film-forming agent within about 48 hours upon exposure to air at a temperature of 20° C.;

(d) from about 0.5% to about 10%, by weight, of an emulsifying agent or agents;

(e) from 0% to about 25% of an organic cosolvent; and (f) the balance water.

The paint compositions of the present invention are more frequently formulated as solvent-based paints. Such solvent-based compositions comprise:

(a) from about 10% to about 60%, preferably from about 15% to about 50%, by weight, of solid pigment particles;

(b) from about 15% to about 60%, preferably from about 20% to about 55%, by weight, of a film-forming agent as described above;

(c) an amount, preferably from about 0.1% to about 10%, of an oxidative catalyst sufficient to cross-link from about 2% to about 60% of the pendant groups of said film-forming agent within about 48 hours upon exposure to air at a temperature of 20° C.; and (d) from about 5% to about 45%, preferably from about 10% to about 30%, by weight, of a solvent for said film-forming agent.

The paint compositions are formulated in the conventional manner known in the art; the particular amounts and components included in any given composition being dependent upon such factors as the likely service environment of the paint, the desired life expectancy of the coating, the method of application, the color, the surface finish, the desired drying time and, the desired cost of the formulation.

Solvents used in the paint compositions are volatile liquids added in order to dissolve the resin component and to modify the viscosity of the coating. To be effective, the solvent must fulfill certain criteria. It must yield a solution of viscosity to suit the storage and application requirements of the paint. It should have the correct evaporation rate and it must deposit a film with optimum characteristics. It should also have an acceptable odor, minimal toxicity, and a reasonable cost. In formulating a paint with convertible resins, as is the case in the present invention, solvents are primarily added to enable the coating to be applied by the appropriate technique. The two most important characteristics of solvents for use in paint compositions are solvent power (ability to dissolve specific resins) and evaporation rate (the relative speed with which they leave the coating after application). Solvents conventionally known for use in paint compositions are useful in the compositions herein; such solvents include, but are not limited to, 2-ethylhexyl acetate, amyl acetate, ethyl acetate, isobutyl acetate, n-propyl acetate, Ektasolve ® DB (diethylene glycol monobutyl ether), Ektasolve ® DE acetate (diethylene glycol monoethyl ether acetate), Carbitol ® acetate, Cellosolve ® acetate, Texanol ® ester alcohol (2,2,4-trimethyl pentanediol-1,3-monoisobutyrate), ethanol, and mixtures thereof. Solvents particularly useful in the paint compositions of the present invention include ethyl acetate, amyl acetate, propylene glycol, mixtures of ethyl acetate and propylene glycol, mixtures of ethyl acetate, ethanol and propylene glycol, and mixtures of ethyl acetate, propylene glycol and water.

The paint compositions of the present invention may also, optionally, contain a storage stabilizer, as described above, to inhibit the free radical polymerization reaction while the paint is stored in its container, but permitting the reaction to take place once the paint is applied to the surface. Such stabilizers are generally contained in the paint compositions in amounts of from about 0.005% to about 5%, by weight, of the total composition. A particularly useful storage stabilizer is tetraphenylverdazyl, having the formula

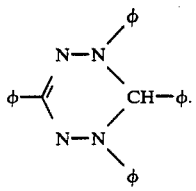

A pigment, which can be organic or inorganic in origin, may be defined as a solid material in the form of small discrete particles, which is incorporated into, but remains insoluble in, the paint medium. A pigment confers a number of attributes to a paint film, notably color and opacity, while influencing the degree of resistance of the film to light, contaminants and other environmental factors, as well as modifying the flow properties of the liquid paint. Pigments may be either organic or inorganic in origin. Inorganic pigments may be conveniently classified by color. Those useful in the present invention include white pigments, such as titanium dioxide, zinc oxide, antimony oxide, white lead, and basic lead sulfate; red pigments, including red iron oxide, red lead, cadmium red, and basic lead silicochromate; yellow pigments, including lead chromates, zinc chromates, yellow iron oxides, cadmium yellow, and calcium plumbate; green pigments, including chromium oxide and lead chrome green; blue pigments, such as Prussian blue and ultramarine blue; and black pigments, such as black iron oxide. Of course, mixtures of various pigments may be used. The pigments are used in combinations and amounts based on factors such as color and color intensity desired, intended use of the paint, and the identity and properties of other components used in the paint formulation. Titanium dioxide, because of its non-toxicity and its very high stability, is a particularly preferred pigment for use in the paint compositions of the present invention. Metallic pigments useful in the present invention include aluminum powder, zinc powder and lead powder. Organic pigments which may be used in the paint compositions include red pigments, such as toluidine red, and arylamide red; yellow pigments, such hansa yellow and benzidine yellow; green pigments, such as pigment green D; blue pigments, such as phthalocyanine blue; and black pigments, such as carbon black. Pigment extenders (e.g., calcium carbonate, silica) may replace part of the pigment used; this is especially true where relatively high pigment levels (e.g., 40-60% of the compositions) are being used.

There is a further class of paint additives that are also insoluble in the paint medium but which impart little or no opacity or color to the film into which they are incorporated. These materials are known as extenders and they are all of inorganic origin. Extenders are incorporated into paints to modify the flow properties, gloss, surface topography and the mechanical and permeability characteristics of the film. Extenders useful in the present invention include barytes, whiting, china clay, mica, and talc.

Dyes are exclusively of organic origin; generally, although not necessarily, dyes and organic pigments are only incorporated into paints whose prime function is decorative rather than protective.

Plasticizers may also be included in the paint compositions defined herein. The main function of a plasticizer is to increase and maintain film flexibility, particularly in paints based on binders which, in the absence of plasticization, tend to be brittle. Plasticizers can either be added physically to the paint composition, generally during manufacture, or they can be chemically incorporated into the polymer molecule by copolymerization techniques. Useful plasticizers include dibutyl phthalate, dioctyl phthalate, triphenyl phosphate, tricresyl phosphate, trichloroethyl phosphate, butyl stearate, and chlorinated paraffins.

Additional components, conventionally used in paint formulations, may be incorporated into the paint compositions of the present invention at their art-established usage levels; such components include, but are not limited to, drying accelerators; biocides, such as complex compounds of phenol, formaldehyde and, less commonly, mercury; fungicides, such as zinc oxide, barium metaborate, organomercurials, organotin compounds, dithiocarbamates, and dichlorfluamide; antifouling agents, such as metallic copper, copper suboxide, tributyl tin oxide and mercuric oxide; pigment dispersing agents; paint viscosity modifiers, such as natural clays, thixotropic resins, and cellulose ethers; flatting agents; flow control agents; anti-sag agents; surface conditioners; yield strength agents; and pigment anti-settling agents, such as surface-active agents, most notably soya lecithin at levels of 1% of the pigment content.

Plastic Compositions

The polymer precursor materials of the present invention are also beneficially incorporated into plastic compositions. Such plastic compositions exhibit very high levels of mechanical strength and durability. The plastic compositions contain from about 20% to about 99%, preferably from about 30% to about 90%, of the polymer precursor materials as described above, or of the cross-linked polymers formed from these materials. In addition, these compositions may optionally also contain from about 0.1% to about 10%, especially from about 0.5% to about 5%, of a free-radical polymerization catalyst, especially one which catalyzes the free radical polymerization of the resins upon exposure to heat, ultraviolet radiation or oxygen. Preferred oxygen-initiated catalysts include the mixtures of hydrocarbon compounds with peroxide-decomposing transition metal materials, especially cobalt(II) compounds, described hereinbefore. The plastic compositions may additionally contain components conventionally found in plastics at their art-established usage levels. Examples of such components include, but are not limited to, extenders (e.g., chopped fiberglass), minerals (e.g., silica), plasticizers, anti-oxidants, hardeners, dyes, colorants, opacifiers or compounds to modify the mechanical, electrical, thermal, chemical or optical properties of the plastic.

The plastic compositions described herein may be manufactured and used in a variety of physical forms for a variety of applications. For example, the resins may be polymerized, such as by an injection molding process, and used as pre-formed sheets or shaped parts (such as in an automobile or boat body). The plastics of the present invention are especially well-adapted for use in reaction injection molding processes; such processes are described in detail in Milby, *Plastics Technology*, McGraw-Hill, Inc., 1973, pages 334-389, incorporated herein by reference. In a reaction injection molding process, the polymer precursor and catalyst, in a liquid state, are injected through channels into a closed mold. The polymerization reaction is then initiated, and a plastic film in the desired configuration is formed.

In contrast, the resins may be used in the form of a liquid composition containing the appropriate catalyst and, if desired, a storage stabilizer. The compositions may be applied as a film to, for example, floors or automobile exteriors, and will polymerize on exposure to the air forming a strong, durable protective coating.

As used herein, all percentages and ratios given are by weight, unless otherwise specified.

The following non-limiting examples illustrate the present invention.

EXAMPLE I

Resin Backbone Preparation

The backbone portion of the precursor materials described in the present application may be prepared using procedures known in the art. See Sorenson and Campbell, *Preparative Methods of Polymer Chemistry*, 2nd Edition, page 154. Methyl acrylate (MA)/hydroxyethyl acrylate (HEA) and methyl acrylate/hydroxyethyl acrylate/acrylic acid (AA) backbone polymers were made in the following manner, using a high pressure lab 3 gallon reactor and the components described in the following table.

| Ingredient | grams | moles | ml (21° C.) |
|---|---|---|---|
| 9MA:2HEA | | | |
| Methyl Acrylate | 3523 | 40.9 | 3380 |
| Hydroxyethyl Acrylate | 1056 | 9.1 | 960 |
| Acrylic Acid | — | — | — |
| | 4579 | 50.0 | 4440 |
| Ethyl Acetate | 6608 | 75.0 | 7340 |
| Dodecyl Mercaptan (DDM) | 324 | 1.6 | |
| Azobisisobutyronitrile (AIBN) | 41.1 | 0.25 | |
| 8MA:3HEA:1AA | | | |
| Methyl Acrylate | 2870 | 33.3 | 2990 |
| Hydroxyethyl Acrylate | 1451 | 12.5 | 1320 |
| Acrylic Acid | 300 | 4.2 | 287 |
| | 9621 | 50.0 | 4597 |
| Ethyl Acetate | 6608 | 75.0 | 7340 |
| Dodecyl Mercaptan (DDM) | 324 | 1.6 | |
| 9MA:2HEA | | | |
| Azobisisobutyronitrile (AIBN) | 41.1 | 0.25 | |

The reactor was first checked for water flow to the coil, jacket and condenser. The reactor was then purged with nitrogen for 1 to 2 minutes. Condenser water was turned on and ingredient addition was begun. Half of the ethyl acetate was charged into the reaction flask and the mixer was started. The monomers were then added in the following order: MA, HEA, AA. Residual monomer was washed into the reaction vehicle using ethyl acetate. Next, DDM was added to the reaction mixture, followed by AIBN which was washed into the reactor with the remainder of the ethyl acetate. The reactor was heated to 49° C., and, since the reaction is exothermic, the temperature was allowed to rise to 60° C. The temperature of the reaction flask was then maintained at 60±3° C. by adjusting the coil cooling water. When the reaction was complete (about 1 hour), the reactor was heated to 75.5±2° C. and maintained at that temperature for 4 to 6 hours to decompose the AIBN. The reactor was then cooled to room temperature and the reaction mixture was removed. The molecular weight of the resin backbone formed ranges from about 2,000 to about 8,000 and can be controlled by adjusting the level of DDM in the reaction mixture.

Capping Reaction of 9MA:2HEA Backbone Resin with Beta Vinyl Itaconyl Chloride

The 9MA:2HEA backbone resin, synthesized above, was capped, using beta vinyl itaconyl chloride (B-VIC), to form a preferred resin material described in the present application. B-VIC was synthesized via the transvinylation of itaconic acid with vinyl acetate; this process is described in concurrently-filed U.S. patent application Ser. No. 290,907, filed 8/7/81 now U.S. Pat. No. 4,400,531 Bush, 4-Vinyl-2-Methylenebutanedioic Acid Compounds, incorporated herein by reference. The reaction and reagents utilized in that procedure are described in the following table.

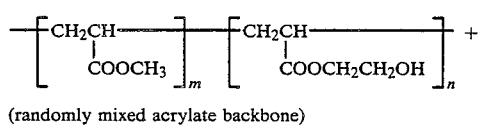

(randomly mixed acrylate backbone)

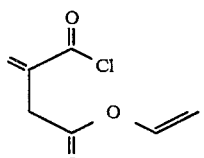

(B-VIC)

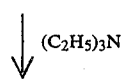

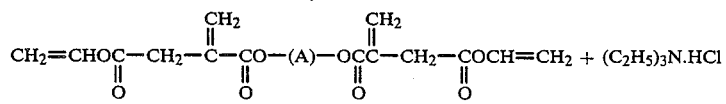

(A) = mixed acrylates

| Reagent | Function | Amount | Moles |
|---|---|---|---|
| (9MA:2HEA) | backbone | 96 g. solids | 0.19 (moles OH) |
| B-VIC | capping group | 33 g. | 0.19 |
| Ethyl Acetate | solvent | 500 ml. | 5.7 |
| Triethylamine | base catalyst | 19 g. | 0.19 |

A two-liter, three-neck round-bottom flask was fitted with the following: a Teflon stirring paddle, shaft and bearing for an overhead mechanical stirrer; a 250 milliliter addition funnel with a side arm; an argon inlet at the top of the addition funnel; a thermometer; and an argon outlet attached to a bubbler.

The flask was flushed with argon and an argon atmosphere maintained during the reaction. The backbone resin in ethyl acetate, B-VIC, and ethyl acetate solvent were placed in the reaction flask. Vigorous stirring was begun and the drop-wise addition from the addition funnel of a solution of distilled triethylamine in an equal amount of ethyl acetate was begun. The triethylamine was distilled through a 12-inch Vigreux column at atmospheric pressure and the middle cut, boiling at 80° C., was used. To promote good mixing and dispersion of the triethylamine and to prevent gellation, it is important that the addition of this solution be slow. The addition step took about 2 hours. During the addition of the triethylamine, the amine hydrochloride formed precipitated as a white solid, giving the reaction mixture a white cloudy appearance. Toward the end of the addition, a more muddy appearance developed as the reaction mixture darkened. At this point, if the color becomes intense, the addition of triethylamine solution should be stopped. After the triethylamine addition is stopped or completed, the reaction should be worked up immediately.

The precipitated amine hydrochloride was filtered through a Buchner funnel with Whatman glass fiber paper using a lab aspirator (about 20 mm mercury). The filtration proceeded rapidly. The filter cake was then washed with 100 milliliters of ethyl acetate. A 10 milliliter aliquot of the ethyl acetate filtrate was concentrated on a rotovap and was used for an NMR spectrum. The rest of the solution was transferred to a 2 liter separatory funnel and washed with an equal volume of saturated sodium bicarbonate solution. An emulsion was formed and several hours was required for a clean, distinct separation of phases. The mixture was allowed to stand overnight to separate. The lower layer still contained some insoluble polymer, but was easily separated from the upper layer. The lower layer consisted of the aqueous phase which was drawn away and discarded. The upper organic phase was drawn into a 2 liter Erlenmeyer flask and 100 grams of anhydrous magnesium sulfate was added and allowed to stand for half an hour. The magnesium sulfate was then filtered out through a Buchner funnel with glass fiber paper. The resulting ethyl acetate solution was then concentrated on a rotovap (H$_2$O) aspirator, 2 mm mercury, 40° C.) to the desired solids level, approximately 75–85% solids. The solids level was determined by the following ASTM method of evaporation at 100° C. for two hours: a sample of the concentrated resin was accurately weighed (to 4 decimal places) into a glass Petri dish, placed in the oven at 100° C. for two hours, cooled to room temperature and reweighed.

The resin was transferred to a bottle and stored under argon at 0° C. It is important that oxygen be excluded to prevent premature polymerization of the resin. The product was then analyzed by NMR (in CDCl$_3$) and IR (neat with residual ethyl acetate). In the infrared spectrum, the vinyl group is seen at 1640 cm$^{-1}$. The NMR spectrum showed the following peaks (chemical shifts reported in δ):

| | |
|---|---|
| 1.73 } 2.33 | two broad peaks for the hydroxy ethyl acrylate portion of the backbone |
| 3.47 | singlet 2H, \CH$_2$/ (from B-itaconate methylene) |
| 3.67 | singlet 3H, (CO$_2$CH$_3$)$_9$ |
| 4.33 | [ singlet 2H, \CH$_2$/ (from alpha-itaconate methylene side product) ] |
| 4.53 4.63 4.73 5.00 | doublets 2H, —CH=CH$_2$ |
| 5.83 6.37 | singlet } singlet } 1H each H\C=C/H |
| 7.03 7.13 7.27 7.37 | quartet 1H, —CH=CH$_2$ |

Capping Reaction of 9MA:2HEA Backbone Resin with Beta Allyl Itaconyl Chloride

As in the previous procedure, the 9MA:2HEA backbone was capped using beta allyl itaconyl chloride to form a preferred resin material. The reagents described in the following table were reacted in the manner of the previous procedure:

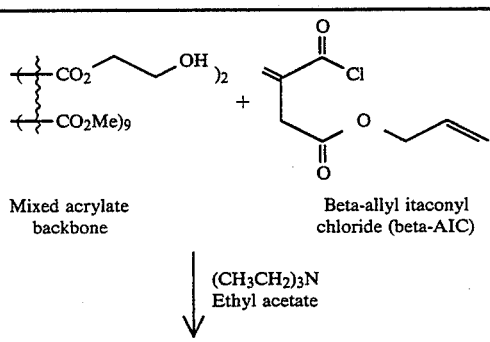

Mixed acrylate backbone

Beta-allyl itaconyl chloride (beta-AIC)

↓ (CH$_3$CH$_2$)$_3$N
Ethyl acetate

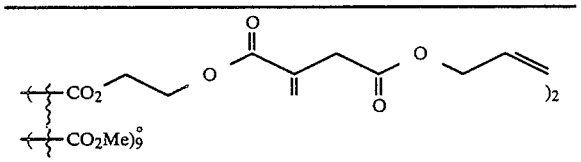

Beta-AIC capped backbone

| Reagent | Function | Amount | Moles |
|---|---|---|---|
| 9MA:2HEA | backbone | 318 g solids | 0.64 (Moles OH) |
| Beta-AIC | capping group | 120 g | 0.65 |
| Ethyl acetate | solvent | 1 l. | 10.2 |
| Triethylamine | catalyst | 64 g | 0.64 |

After work-up in the manner of the previous procedure and rotovapping to the desired solids level (approximately 75–85% solids), the resin was transferred to a bottle and stored under argon at 0° C. The identity of the resin was confirmed by NMR and IR spectra.

Capping Reaction of (8Ma:3HEA:1AA) Backbone Resin with Beta Vinyl Itconyl Chloride A preferred resin of the present application was synthesized using 8MA:3HEA:1AA backbone resin, synthesized above, and beta vinyl itaconyl chloride, using the procedure described below; the reaction and reagents used in the reaction are given in the following table.

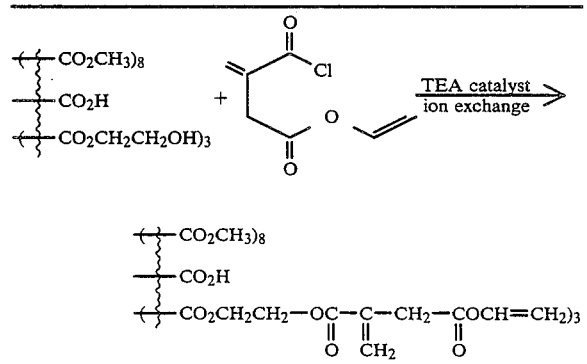

| Reagent | Function | Amount | Moles |
|---|---|---|---|
| (8MA:3HEA:1AA) | backbone | 50 g. solids | 0.135 (moles OH) |
| B-VIC | capping group | 23.5 g. | 0.135 |
| Ethyl acetate | solvent | 200 ml. | 2.3 |
| *Amberlyst A-21 | ion exchange resin to take up acid | 64 g. (dry resin) | 0.27 |
| Triethylamine(TEA) | catalyst | 0.68 g. | 0.0068 |

*Amberlyst A-21 (available from Rohm & Haas) is a weakly basic anionic exchange resin intended for the absorption of acidic solutes from either aqueous or non-aqueous media. The resin is furnished in the hydrated, free-base form and the water must be removed or replaced with ethyl acetate prior to use.

A one-liter 3-neck round-bottom flask was fitted with the following: a Teflon stirring paddle, shaft and bearing for an overhead mechanical stirrer; a 250-milliliter addition funnel with a side arm; an argon inlet at the top of the addition funnel; a thermometer; and an argon outlet attached to a bubbler.

The ion exchange resin was conditioned by treating it with several volumes of methanol in a column, allowing the methanol to pass down at a flow rate of 4 bed volumes per hour. Further conditioning of the methanol-moist resin was then performed by passing several volumes of ethyl acetate through the resin bed at the same flow rate. The resin was used wet in the ethyl acetate solution, although it may also be used in a dry state. In either case, it is imperative that no methanol remain in the resin, due to its reactivity with beta vinyl itaconyl chloride. If it is desired to use dry resin, the ethyl acetate solvent may be removed using reduced pressure on a rotovap at a temperature less than 75° C.

The flask was flushed with argon and an argon atmosphere was maintained during the reaction. The backbone resin in ethyl acetate, the ion exchange resin, triethylamine catalyst and the ethyl acetate solvent were placed in the reaction flask. Vigorous stirring was begun and a solution of B-VIC in an equal volume of ethyl acetate was added dropwise to the reaction vessel from the addition funnel. The addition required about 15 to 30 minutes. At the end of the addition, the reaction was slightly exothermic (about 35° C.).

The reaction mixture was allowed to stir at room temperature under argon for an additional 3 hours and was then worked up in the following manner. The ion exchange resin was filtered through a Buchner funnel with glass fiber paper and washed with 200 milliliters of ethyl acetate. A 10 milliliter aliquot of the ethyl acetate filtrate was concentrated on a rotovap and used for an NMR spectrum. The rest of the solution was transferred to a one liter separatory funnel and washed with an equal volume of saturated sodium bicarbonate solution. An emulsion, which required several hours to form a clean, distinct separation of phases, resulted. The mixture was allowed to stand overnight to separate. The lower layer contained some insoluble polymer, but was easily separated from the upper layer. The lower layer (the aqueous phase) was drawn away and discarded. The upper organic phase was drawn into a one liter Erlenmeyer flask and 100 grams of anhydrous magnesium sulfate were added and allowed to stand for one half hour. The magnesium sulfate was then filtered out through a Buchner funnel with glass fiber paper. The resulting ethyl acetate solution was concentrated on a rotovap ($H_2O$ aspirator, 20 mm mercury, 40° C.) to the desired solids level, approximately 75–85% solids. The solids level was determined by the following ASTM method of evaporation at 100° C. for two hours: a sample of the concentrated resin was accurately weighed (to 4 decimal places) into a glass Petri dish, placed in an oven at 100° C. for two hours, cooled to room temperature and reweighed.

The resin was then transferred to a bottle and stored under argon at 0° C. It is important that oxygen be excluded to prevent premature polymerization. The identity of the resin formed was confirmed by NMR and IR spectra.

EXAMPLE II

Using conventional procedures known in the art (see Sorenson and Campbell, *Preparative Methods of Polymer Chemistry*, 2nd Edition, page 154) and the techniques described in Example I, additional resin materials of the present invention were synthesized as described below.

A poly(ethylene-co-trimethylolpropylene adipate) backbone resin was synthesized as follows. The reaction flask was charged with 305 grams adipic acid, 22.4 grams trimethylolpropane, 186 grams ethylene glycol and 8.6 grams p-toluenesulfonic acid monohydrate. The mixture was heated at 120° C., under an argon atmosphere, overnight; 90 milliliters of water were collected in a Dean Stark trap. The resulting polyester backbone was analyzed for hydroxyl and carboxyl end groups by titration.

Similarly, a poly(ethylene-co-pentaerythritol adipate) backbone was synthesized in the following manner. The reaction flask was charged with 8.5 grams pentaerythritol, 93 grams ethylene glycol, 153 grams adipic acid and 4.3 grams p-toluenesulfonic acid. The mixture was heated at 120° C., under argon, until the distillation of water ceased.

Vinyl itaconate-capped polyesters of the present invention can be prepared from the backbones synthesized above by either of two methods: (a) addition of itaconic anhydride to the backbone, forming the acid intermediate, followed by transvinylation with vinyl acetate; or (b) a more direct route by acylation with vinyl itaconyl chloride of the free hydroxyls on the backbone resin. For example, according to route (a), 199 grams poly(ethylene-co-pentaerythritol adipate) polyester backbone, 52 grams itaconic anhydride and 200 milligram hydroquinone were heated at 90° C., under argon, for three hours. To the reaction flask was added 700 milliliters vinyl acetate, 5 grams mecuric acetate and 1 gram concentrated sulfuric acid. Refluxing was continued for 2½ hours and the final reaction mixture was worked up according to conventional methods.

Polycarbonate backbone resins may be prepared by conventional methods from bisphenols or diols and phosgene or in a melt polycondensation with diphenyl carbonate. For example, equal molar quantities of bisphenol A (25 grams) and diphenyl carbonate (24 grams) were mixed under argon and heated at 140° C. until the distillation of phenol ceased. A vacuum was then applied to remove residual phenol.

Another polycarbonate backbone was prepared by mixing 78 grams hexamethylene glycol, 72 grams diethyl carbonate and 0.25 grams sodium and heating them at 110° C., under argon, until the distillation of ethanol ceased. The vinyl itaconate-capped resin of the present invention was then prepared from this backbone material using the itaconic anhydride-vinyl acetate route, described above.

Mixed acrylate backbones were also prepared using the same procedure described for preparing methyl acrylate resins in Example I. The capping reaction with vinyl itaconate was also carried out in the manner described in Example I. Using this procedure, the following backbone resins were prepared: 9 ethyl acrylate:2 hydroxyethyl acrylate:1 acrylic acid; 9 butyl acrylate:2 hydroxyethyl acrylate:1 acrylic acid; and 14 methyl methacrylate:3 hydroxyethyl acrylate:3 acrylic acid. By way of example, the (14 MMA:3HEA:1AA) vinyl itaconate resin of the present invention was prepared as follows. The backbone resin was synthesized using the procedure described in Example I by reacting 50 grams methyl methacrylate, 12.5 grams 2-hydroxyethyl acrylate, 7.7 grams acrylic acid, 1 gram AIBN, 2 grams dodecanethiol and 50 milliliters ethyl acetate. This backbone resin was then capped using an excess of alpha-vinyl itaconyl chloride in ethyl acetate with an equal molar amount of calcium carbonate base, as described in Example I.

EXAMPLE III

High solids, solvent-based paint formulae of the present invention, having the compositions given below, were prepared in a conventional manner. The resin, titanium dioxide, silica and ethyl acetate components were thoroughly mixed together in a Cowles or flat blade mixer until the components were well dispersed. The initiator system, i.e., the hydrocarbon peroxide precursor and cobalt(II) compound, were then added into the composition and mixed and dispersed gently. The flatting agent may be added to the initial mixture or to the dispersed mixture before the initiator is added. The compositions, below, provided high solids paint compositions which exhibited excellent covering characteristics, strength and durability.

| Component | parts (by weight) |
|---|---|
| Composition A | |
| (8MA:3HEA:1AA) vinyl itaconate | 35 |
| TiO$_2$ (Rutile) | 30 |
| Amorphous silica | 5 |
| Micron-sized silica flatting agent | 5 |
| Ethyl acetate | 23 |
| 1,3-bis(1,3-dioxolan-2-yl)propane | 2 |
| Cobalt naphthenate | 0.1 |
| Composition B | |
| (9MA:2HEA) vinyl itaconate | 25 |
| TiO$_2$ (Rutile) | 40 |
| Amorphous silica | 5 |
| Flatting agent (silica) | 5 |
| Ethyl acetate | 23 |
| 1,3-bis(1,3-dioxolan-2-yl)propane | 2 |
| Cobalt naphthenate | 0.1 |
| Composition C | |
| (8MA:3HEA:1AA) vinyl itaconate | 35 |
| TiO$_2$ | 30 |
| Amorphous silica | 5 |
| Flatting agent (silica) | 5 |
| Ethyl acetate | 8 |
| Ethanol | 8 |
| Propylene glycol | 7 |
| 1,3-bis(1,3-dioxolan-2-yl)propane | 2 |
| Cobalt naphthenate | 0.1 |
| Composition D | |
| (9MA:2HEA) vinyl itaconate | 30 |
| TiO$_2$ | 30 |
| 1,3-bis(1,3-dioxolan-2-yl)propane | 2 |
| Cobalt naphthenate | 0.1 |

Substantially similar results are obtained where the resin materials contained in the above compositions are replaced, in whole or in part, by (8MA:3HEA:1AA) vinyl itaconate, (9MA:2HEA)vinyl itaconate, poly-(ethylene-co-trimethylolpropylene adipate) vinyl itaconate, poly(ethylene-co-pentaerythritol adipate) vinyl itaconate, 9 ethyl acrylate:2 hydroxyethyl acrylate:1 acrylic acid vinyl itaconate, 9 butyl acrylate:2 hydroxyethyl acrylate:1 acrylic acid vinyl itaconate, 14 methyl methacrylate:3 hydroxyethyl acrylate:3 acrylic acid vinyl itaconate, (9MA:2HEA) beta-allyl itaconate, or resins having backbones as previously described and wherein the pendant groups are selected from monomethyl itaconate, 4-allyl-2-methylenesuccinate, 1-vinyl-2-methylenesuccinate, p-vinylbenzoic acid, mono-vinyl maleate, methyl methacrylate, N-phenyl-2-methylenesuccinimide and substituted N-phenyl-2-methylene-succinimides.

Substantially similar results are also obtained when the titanium dioxide pigment component in the above compositions is replaced, in whole or in part, by zinc oxide, antimony oxide, white lead, basic lead sulfate, red iron oxide, red lead, cadmium red, basic lead silicochromate, lead chromate, zinc chromate, yellow iron oxide, cadmium yellow, calcium plumbate, chromium oxide, lead chrome green, Prussian blue, ultramarine blue, black iron oxide, aluminum powder, zinc powder, lead powder, toluidine red, arylamine red, hansa yellow, benzidine yellow, pigment green D, phthalocyanine blue, carbon black, and mixtures thereof.

Similar results are also obtained wherein the hydrocarbon peroxide precursor contained in the above compositions is replaced, in whole or in part, with

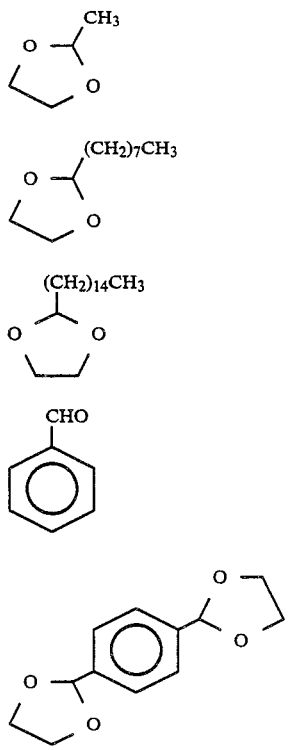

or mixtures thereof.

Similar results also obtained where the cobalt naphthenate in the above compositions is replaced, in whole or in part, with cobalt(II) dipivaloylmethane, cobalt(II) acetylacetonate, cobalt(II) acetate, cobalt(II) decanoate, and mixtures thereof.

The compositions described above may also contain an effective amount of a storage stabilizer component, such as from about 0.1 to about 1% of triphenyl verdazyl.

EXAMPLE IV

An emulsion-based paint formulation of the present invention was prepared in the following manner.
Part 1:
6.7 grams (8MA:3HEA:1AA) vinyl itaconate (about 85% solids)
6.7 grams TiO$_2$
1.8 grams propylene glycol
0.2 gram AMP-95 (2-amino-2-methyl-1-propanol, available from IMC Corporation)

The above components were mixed well with a flat blade high speed mixer.
Part 2:
7.2 grams water
0.9 gram carbitol acetate(diethylene glycol monoethyl ether acetate)
0.5 gram nopcosperse 44 (dispersant for TiO$_2$ in aqueous systems, available from Diamond Shamrock)
0.1 gram DM-710 Igepal (dinonylphenoxypoly(ethyleneoxy)ethanol nonionic surfactant commercially available from GAF Corp.)
0.05 gram DM-880 Igepal (dinonylphenoxypoly(ethyleneoxy)ethanol nonionic surfactant commercially available from GAF Corp.)

The components of part 2 were mixed until all the surfactants were dissolved. Then, part 3, below, was added to part 2 in small portions with stirring; the stirring was continued until the mixture was well dispersed.
Part 3:
4 grams TiO$_2$ The part 2 plus part 3 mixture was then added gradually to part 1, with stirring, the stirring continuing until a homogenous mixture was formed. Finally, the initiator system (a mixture of about 0.5 part 1,3-bis(1,3-dioxolan-2-yl)propane and 0.025 part cobalt naphthenate) was mixed into the emulsion.

The emulsion paint formed by this procedure exhibits excellent covering qualities, is high in solids, and is strong and durable under heavy wear conditions.

An additional emulsion-based paint formulation of the present invention was formulated as follows:
Part 1:
10 grams 9MA:2HEA capped with allyl itaconate (70% solids)
0.1 grams ethoxylated sorbitan monoleate (20 ethoxylate groups per sorbitan monoleate-Tween 80)
0.45 grams cobalt naphthenate (6% cobalt, from Sheppard Chemical Co.)
0.54 grams Lupersol 256 (2,5-dimethyl-2,5-bis(2 ethyl hexanoylperoxy)hexane, Pennwalt Lucidal Co.)

These ingredients were brought to homogeneous solution.
4.0 grams of 1% aqueous polyethoxy-polypropoxy block copolymer (Pluronic F87, Wyandotte BASF Co.) was added, and emulsified with high shear mixing.
Part 2:
6 grams titanium dioxide
5 grams 1% aqueous Pluronic F-87

In forming part 2, the TiO$_2$ was blended into the aqueous Pluronic solution until a smooth mixture resulted.

Part 2 was then added to Part 1 slowly and with hand stirring until transfer was complete, then the composition was subjected to high shear mixing until uniform.

EXAMPLE V

A paint composition, having the components listed below, was formulated according to the method described in Example III. This paint was then compared with a commercial latex paint (i.e., Sears Easy Living ® paint) to determine their comparative properties.

| Component | Weight % |
| --- | --- |
| (8MA:3HEA:1AA) vinyl itaconate | 35 |
| TiO$_2$ | 40 |
| Ethyl acetate | 22 |
| 1,3-bis(1,3-dioxolan-2-yl)propane | 2 |
| Cobalt naphthenate | 1 |

When applied to a wall and permitted to dry, the surface formed by the paint of the present invention was smooth and continuous, whereas the surface of the commercial paint was characterized by spaces in the matrix and the particulate nature of the latex. This was very clearly seen when the two surfaces were viewed by scanning electron microscope at a magnification of 500X. This difference in film continuity carries over into the macroscopic properties of enhanced durability, water resistance and decreased permeability for the paint of the present invention.

The paint of the present invention was compared to the commercial paint in terms of stain resistance, using alkaline cleaners, on a representative variety of stains using the following procedure.

The paints were applied, using a thin film applicator, on 6½ inch by 17 inch scrub test panels so that the dried film thickness was about 2 mils. The films were allowed to air dry and cure for one week. Stains were then applied to each painted panel in a 2½ inch strip widthwise across the panel in the center of the dry paint film. Quantities and types of stains applied were as follows: (a) oil stain—30 drops from a Pasteur pipette; (b) crayon stain—red Crayola ® crayon—2½ inch band at 200 gram pressure; (c) High Point ® instant coffee (0.2 gram); (d) French's ® mustard (0.2 gram); (e) ballpoint pen ink, Bic ® (2½ inch band, 200 gram pressure); (f) aluminum mar (2½ inch band, 200 gram pressure). The stains were allowed to set for 15 minutes. Using a Gardner colorimeter, model XL-23, the L,a,b and Hunter whiteness of both stained and unstained paint portions were made. The samples were then placed in a scrub machine having a large sponge holder. The sponge was moistened and squeezed by hand and then was wet with 15 milliliters of a cleaning solution made up of Mr. Clean ®, commercially available from The Procter & Gamble Company, in distilled water (weight ratio of cleaner:water = 1:64). On each sample the machine was permitted to run 5 cycles back and forth. The Hunter whiteness readings of the paint samples were then read again and were compared to the prescrub readings.

Using this procedure, the paint composition of the present invention showed a significant stain removal advantage vs. the commercial paint over the range of soils tested. Because the paint of the present invention provides a more continuous film, the staining substances cannot penetrate the surface and become entrapped, as they can in latex paint; therefore, stains remain only on the surface of the paint of the present invention and stain removal is greatly enhanced.

The paint composition of the present invention also provided significant advantages over the commercial paint in mar resistance, hardness and impact tests using ASTM-established test procedures. Durability advantages were seen in the improved washability (the paint compositions of the present invention outscrubbed the commercial paint by 3 to 4 times in ASTM scrub tests), and in excellent chemical resistance (i.e., the paint compositions of the present invention were not removed by organic solvents, such as acetone, or by full-strength alkaline cleaners).

EXAMPLE VI

Plastic compositions incorporating the technology of the present invention are illustrated by the following formulations.

| Component | Weight % |
|---|---|
| (8MA:3HEA:1AA) vinyl itaconate | 75 |
| 1,3-bis(1,3-dioxolan-2-yl)propane | 4 |
| cobalt naphthenate | 2 |
| miscellaneous components (e.g., plasticizer, colorant, triphenyl verdazyl storage stabilizer, extender) | balance |

The components in the above table are combined, using conventional mixing and dispersion techniques, to form a plastic precursor material. This material may be sold as is, to be formed or molded by the purchaser into plastic sheets or molded plastic parts. The plastic formed exhibits very high strength and durability characteristics. The oxygen-initiated catalyst system in the above composition may be replaced by a heat-initiated catalyst system, and the composition may then be used in a conventional injection molding process to form shaped plastic articles. Obviously, the above composition may also be preformed into sheets or molded plastic articles and may be sold or used in that form. In that case composition of the articles is essentially the same as that given in the table except that the vinyl itaconyl resin precursors have reacted to form cross-linked polymers.

| Component | Weight % |
|---|---|
| (9MA:2HEA) vinyl itaconate | 40 |
| 1,3-bis(1,3-dioxolan-2-yl)propane | 3 |
| cobalt naphthenate | 0.15 |
| triphenyl verdazyl | 0.1 |
| ethyl acetate | 50 |
| miscellaneous components (e.g., hardener, anti-oxidant, sheeting agent) | balance |

The components described in the above table may be combined using conventional mixing and dispersion techniques to form a plastic coating composition. This composition may be applied to, for example, floors or automobile bodies in a thin coat, polymerizing upon exposure to oxygen, forming a strong and durable transparent protective coating on the surface.

In either of the above plastic compositions, the hydrocarbon component of the catalyst system may be replaced, in whose or in part, by

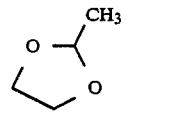

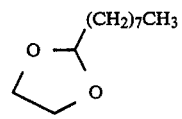

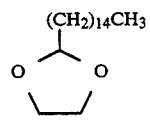

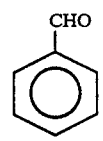

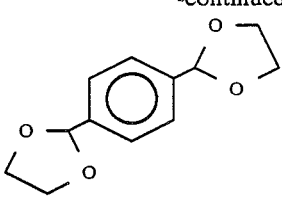

and mixtures thereof.

In addition, the cobalt naphthenate, in either of the above compositions can be replaced, in whole or in part, by cobalt(II) dipivalolylmethane, cobalt(II) acetylacetonate, cobalt(II) acetate, cobalt(II) decanoate, and mixtures thereof.

The resin material used in either of the above two plastic compositions may be replaced, in whole or in part, by (8MA:3HEA:1AA) vinyl itaconate, (9MA:2-HEA) vinyl itaconate, poly(ethylene-co-trimethylolpropylene adipate)vinyl itaconate, poly(ethylene-co-pentaerythritol adipate)vinyl itaconate, 9 ethyl acrylate:2 hydroxyethyl acrylate:1 acrylic acid vinyl itaconate, 9 butyl acrylate:2 hydroxyethyl acrylate:1 acrylic acid vinyl itaconate, 14 methyl methacrylate:3 hydroxyethyl acrylate:3 acrylic acid vinyl itaconate; (9MA:2HEA)beta-allyl itaconate; or polymer precursor materials having the backbones given above but wherein the pendant group is replaced, in whole or in part, by mono-methyl itaconate, 1-vinyl-2-methylenesuccinate, 4-allyl-2-methylenesuccinate, p-vinylbenzoic acid, mono-vinyl maleate, methyl methacrylate, N-phenyl-2-methylenesuccinimide, substituted N-phenyl-2-methylenesuccinimides, or mixtures thereof.

What is claimed is:

1. A composition comprising an agent for preparing crosslinked polymers comprising:
    (a) a major portion of a polymer selected from the group consisting of polyacrylates and polymethacrylates having a molecular weight of from about 1,000 to about 10,000, this portion constituting the backbone of said agent; and
    (b) a minor portion of mono- or disubstituted olefinic groups pendant from said backbone, with the olefinic substituents on the groups being unpolymerized, said groups having polymerization rate constants of from about $10 \times 10^{-4}$ to about $1000 \times 10^{-4}$ mole$^{-\frac{1}{2}}$ liter$^{\frac{1}{2}}$ minute$^{-1}$ at 70° C.;
together with an amount of a catalyst sufficient to crosslink from about 2% to about 60% of the pendant groups of said agent within about 48 hours upon exposure to oxygen, heat, light or ultraviolet radiation.

2. A composition comprising an agent for preparing crosslinked polymers comprising:
    (a) a major portion of a polymer selected from the group consisting of polyacrylates and polymethacrylates having a molecular weight of from about 1,000 to about 10,000, this portion constituting the backbone of said agent; and
    (b) a minor portion of mono- or disubstituted olefinic groups pendant from said backbone, with the olefinic substituents on the groups being unpolymerized, said groups having polymerization rate constants of from about $10 \times 10^{-4}$ to about $1000 \times 10^{-4}$ mole$^{-\frac{1}{2}}$ liter$^{\frac{1}{2}}$ minute$^{-1}$ at 70° C.;
together with an amount of an oxidative catalyst sufficient to crosslink from about 2% to about 60% of the pendant groups of said agent within about 48 hours upon exposure to air at a temperature of about 20° C.

3. A composition according to claim 2 wherein the backbone of the agent for preparing crosslinked polymers is a polyacrylate material, having a formula selected from the group consisting of

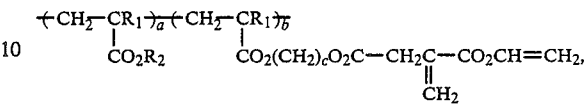

and

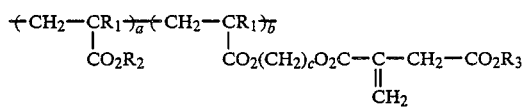

wherein $R_1$ is hydrogen or methyl; $R_2$ is hydrogen or an ester substituent; $R_3$ is vinyl or allyl; a is from about 10 to about 100; b is from about 0.1a to about a; and c is from about 1 to about 20.

4. A composition according to claim 2 wherein the catalyst consists essentially of: (a) a hydrocarbon compound selected from the group consisting of

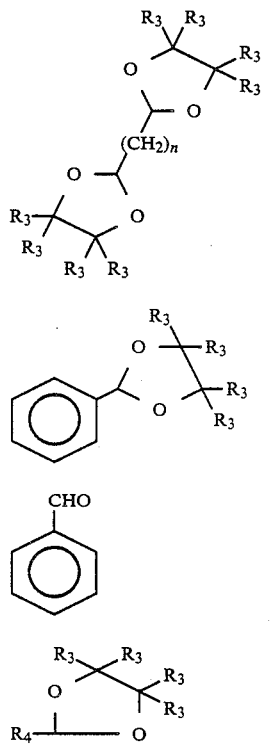

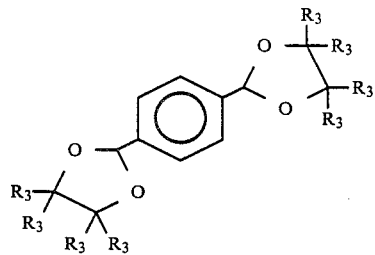

and mixtures thereof, wherein each $R_3$ is hydrogen, methyl, phenyl or COOH; $R_4$ is $C_1$–$C_{20}$ alkyl or alkenyl; and n is from about 1 to 10; and (b) a peroxide-decomposing transition metal catalyst.

5. A composition according to claim 4 wherein the transition metal catalyst is a cobalt(II) compound.

6. A composition according to claim 3 wherein the catalyst consists essentially of: (a) a hydrocarbon compound selected from the group consisting of

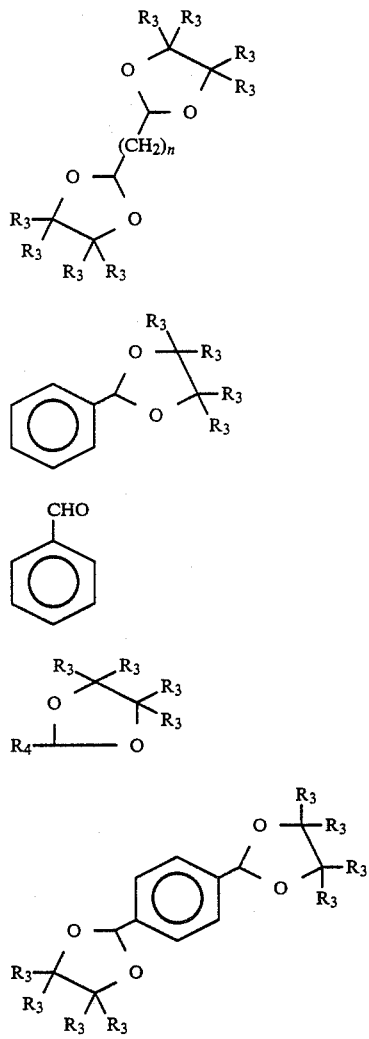

and mixtures thereof, wherein each $R_3$ is hydrogen, methyl, phenyl or COOH; $R_4$ is $C_1$–$C_{20}$ alkyl or alkenyl; and n is from about 1 to 10; and (b) a cobalt(II) compound.

7. A composition according to claim 6 wherein the cobalt(II) compound is selected from the group consisting of cobalt(II) dipivaloylmethane, cobalt(II) acetylacetonate, cobalt(II) acetate, cobalt(II) decanoate, cobalt(II) naphthenate, and mixtures thereof.

8. A composition according to claim 6 which contains from about 0.5% to about 5% of the oxidative catalyst.

9. A composition according to claim 6 wherein the hydrocarbon compound is selected from the group consisting of

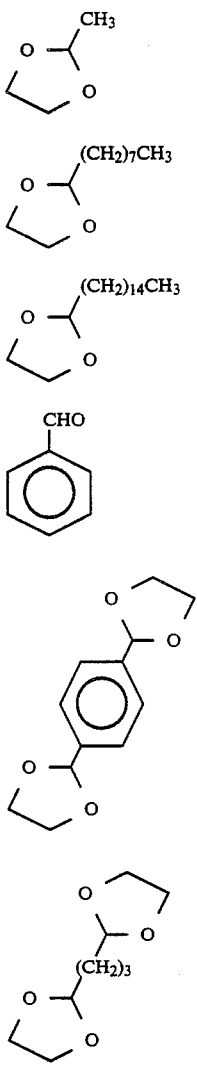

and mixtures thereof.

10. A composition according to claim 6 which comprises, as an additional component, an effective amount of a polymerization inhibitor as a storage stabilizer.

11. A composition according to claim 10 wherein the storage stabilizer has the formula

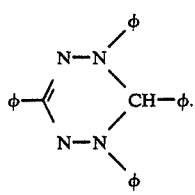

12. A composition according to claim 11 which contains from about 0.005% to about 2% of the storage stabilizer.

13. A paint composition comprising:
(a) from about 10% to about 60% by weight of solid pigment particles;
(b) from about 15% to about 60% by weight of a film-forming agent comprising:
(1) a major portion of a polymer selected from the group consisting of polyacrylates and polymethacrylates having a molecular weight of from about 1,000 to about 10,000, this portion constituting the backbone of said agent; and (2) a minor portion of mono- or disubstituted olefinic groups pendant from said backbone, with the olefinic substituents on the groups being unpolymerized, said groups having polymerization rate constants of from about $10 \times 10^{-4}$ to about $600 \times 10^{-4}$ mole$^{-\frac{1}{2}}$ liter$^{\frac{1}{2}}$ minute$^{-1}$;

(c) an effective amount of an oxidative catalyst sufficient to crosslink from about 2% to about 60% of the pendant groups of said film-forming agent within about 48 hours upon exposure to air at a temperature 20° C.;

(d) from 0.5% to about 10% of an emulsifying agent;

(e) from 0% to about 25% of an organic co-solvent; and (f) water.

14. A paint composition comprising:

(a) from about 10% to about 60% by weight of solid pigment particles;

(b) from about 15% to about 60% by weight of a film-forming agent comprising:
(1) a major portion of a polymer selected from the group consisting of polyacrylates and polymethacylates having a molecular weight of from about 1,000 to about 10,000, this portion constituting the backbone of said agent; and
(2) a minor portion of mono- or disubstituted olefinic groups pendant from said backbone, with the olefinic substituents on the groups being unpolymerized, said groups having polymerization rate constants of from about $10 \times 10^{-4}$ to about $600 \times 10^{-4}$ mole$^{-\frac{1}{2}}$ liter$^{\frac{1}{2}}$ minute$^{-1}$;

(c) an effective amount of an oxidative catalyst sufficient to crosslink from about 2% to about 60% of the pendant groups of said film-forming agent within about 48 hours upon exposure to air at a temperature of 20° C.; and (d) a solvent for said film-forming agent.

15. A paint composition according to claim 14 wherein the film-forming agent contains pendant groups selected from the group consisting of monomethyl itaconate, 4-allyl-2-methylenesuccinate, 1-vinyl-2-methylenesuccinate, p-vinylbenzoic acid, mono-vinyl maleate, methyl methacrylate, 4-vinyl-2-methylenesuccinate, N-phenyl-2-methylenesuccinimide, substituted N-phenyl-2-methylenesuccinimide, and mixtures thereof.

16. A paint composition according to claim 14 wherein the polymer contains a polyacrylate backbone having a formula selected from the group consisting of

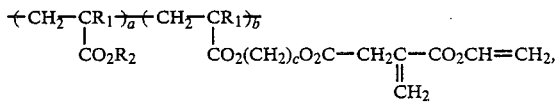

and

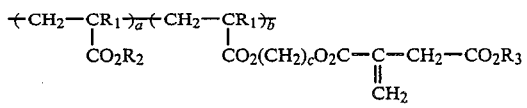

wherein $R_1$ is hydrogen or methyl; $R_2$ is hydrogen or an ester substituent; $R_3$ is vinyl or allyl; a is from about 10 to about 100; b is from about 0.1a to about a; and c is from about 1 to about 20.

17. A paint composition according to claim 16 wherein the film-forming agent has a formula selected from

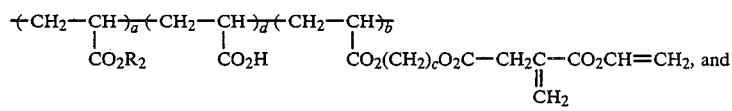

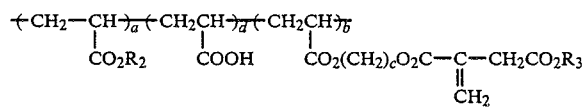

wherein $R_2$ is $C_1$-$C_5$ alkyl; $R_3$ is vinyl or allyl; a is from about 10 to about 100; b is from about 0.1a to about a; c is from about 1 to about 5; and d is from about 0.3b to about 0.5b.

18. A paint composition according to claim 17 wherein the catalyst consists essentially of: (a) a hydrocarbon compound selected from the group consisting of

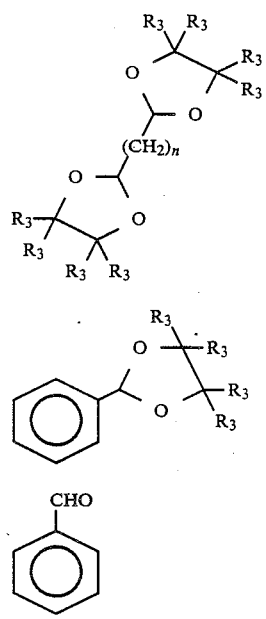

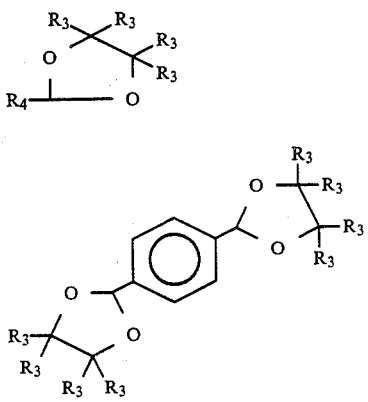

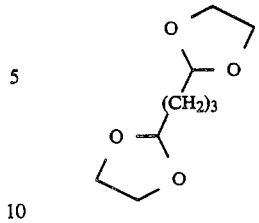

and mixtures thereof, wherein each $R_3$ is hydrogen, methyl phenyl or COOH; $R_4$ is $C_1$-$C_{20}$ alkyl or alkenyl; and n is from about 1 to 10; and (b) a peroxide-decomposing transition metal catalyst.

19. A paint composition according to claim 18 wherein the transition metal catalyst is a cobalt(II) compound.

20. A paint composition according to claim 19 wherein the mole ratio of hydrocarbon compound to cobalt(II) compound is from about 5 to about 5,000.

21. A paint composition according to claim 20 wherein the hydrocarbon component is selected from the group consisting of

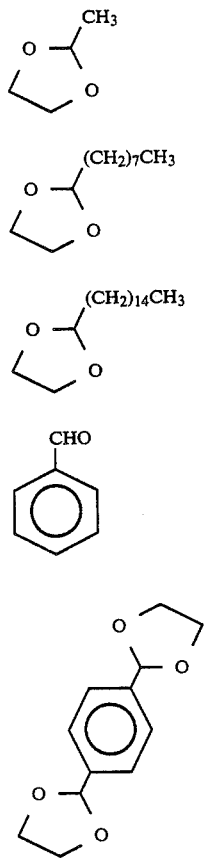

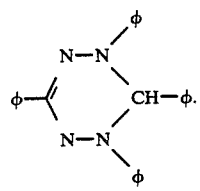

and mixtures thereof.

22. A paint composition according to claim 20 wherein the cobalt(II) compound is selected from the group consisting of cobalt salts of carboxylic acids and a 2,4-pentanedione complex of cobalt(II).

23. A paint composition according to claim 22 wherein the cobalt(II) compound is selected from the group consisting of cobalt(II) dipivaloylmethane, cobalt(II) acetylacetonate, cobalt(II) acetate, cobalt(II) decanoate, cobalt(II) naphthenate, and mixtures thereof.

24. A paint composition according to claim 18 wherein the solvent is selected from the group consisting of ethyl acetate, amyl acetate, propylene glycol, mixtures of ethyl acetate and propylene glycol, mixtures of ethyl acetate, ethanol and propylene glycol, and mixtures of ethyl acetate, propylene glycol and water.

25. A paint composition according to claim 14 which additionally contains from about 0.005% to about 5% of a storage stabilizer.

26. A paint composition according to claim 18 which additionally contains from about 0.005% to about 5% of a storage stabilizer.

27. A paint composition according to claim 26 wherein the storage stabilizer has the formula $$\phi-\overset{N-N}{\underset{N-N}{\diagup}}\overset{\diagdown\phi}{\underset{\diagdown\phi}{CH-\phi.}}$$

28. A plastic composition comprising from about 20% to about 99% of a cross-linked polymer made from the film-forming agent comprising:
(a) a major portion of a polymer selected from the group consisting of polyacrylates and polymethacrylates having a molecular weight of from about 1,000 to about 10,000, this portion constituting the backbone of said agent; and
(b) a minor portion of mono- or disubstituted olefinic groups pendant from said backbone, with the olefinic substituents on the groups being unpolymerized, said groups having polymerization rate constants of from about $10 \times 10^{-4}$ to about $600 \times 10^{-4}$ mole$^{-\frac{1}{2}}$ liter$^{\frac{1}{2}}$ minute$^{-1}$.

29. A plastic composition according to claim 28 wherein the film-forming agent has pendant groups selected from the group consisting of monomethyl itaconate, 4-allyl-2-methylenesuccinate, 1-vinyl-2-methylenesuccinate, p-vinylbenzoic acid, mono-vinyl maleate, methyl methacrylate, 4-vinyl-2-methylenesuccinate, N-phenyl-2-methylenesuccinimide, substituted N-phenyl-2-methylenesuccinimide, and mixtures thereof.

30. A plastic composition according to claim 28 wherein the film-forming agent has a backbone which is a polyacrylate material, having a formula selected from the group consisting of

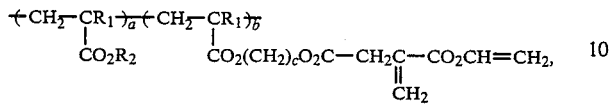

and

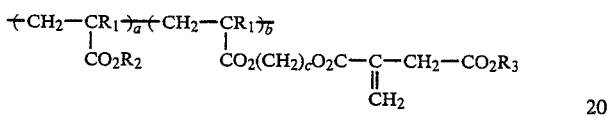

wherein $R_1$ is hydrogen or methyl; $R_2$ is hydrogen or an ester substituent; $R_3$ is vinyl or allyl; a is from about 10 to about 100; b is from about 0.1a to about a; and c is from about 1 to about 20.

31. A composition for forming plastics comprising from about 20% to about 99% of a film-forming agent comprising:
  (a) a major portion of a polymer selected from the group consisting of polyacrylates and polymethacrylates having a molecular weight of from about 1,000 to about 10,000, this portion constituting the backbone of said agent; and
  (b) a minor portion of mono- or disubstituted olefinic groups pendant from said backbone, with the olefinic substituents on the groups being unpolymerized, said groups having polymerization rate constants of from about $10 \times 10^{-4}$ to about $600 \times 10^{-4}$ mole$^{-\frac{1}{2}}$ liter$^{\frac{1}{2}}$ minute$^{-1}$;

and from about 0.15% to about 10% of a free-radical polymerization catalyst.

32. A composition for forming plastics according to claim 31, which contains, as the free-radical polymerization catalyst, from about 0.15% to about 10% of a catalyst consisting essentially of: (a) a hydrocarbon compound selected from the group consisting of

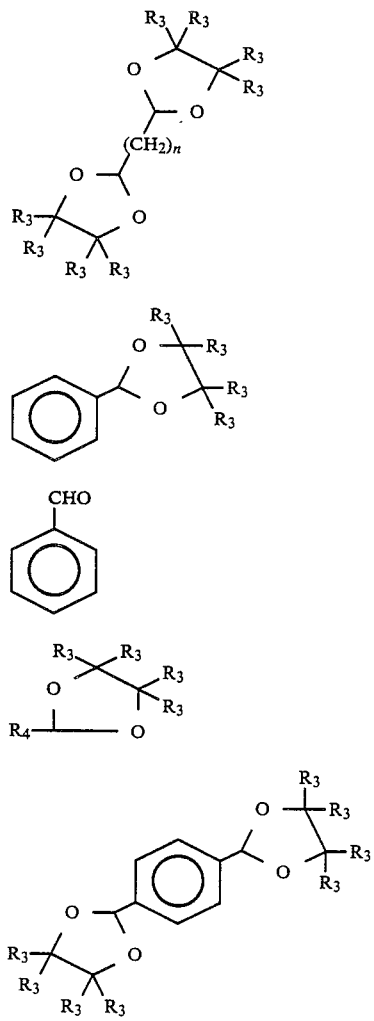

and mixtures thereof, wherein each $R_3$ is hydrogen, methyl, phenyl or COOH; $R_4$ is $C_1$-$C_{20}$ alkyl or alkenyl; and n is from about 1 to 10; and (b) a peroxide-decomposing transition metal catalyst.

33. A composition according to claim 32 wherein the transition metal catalyst is a cobalt(II) compound.

34. A composition according to claim 33 wherein the mole ratio of hydrocarbon compound to cobalt(II) compound is from about 5 to about 5,000.

35. A composition according to claim 34 wherein the cobalt(II) compound is selected from the group consisting of cobalt(II) dipivaloylmethane, cobalt(II) acetylacetonate, cobalt(II) acetate, cobalt(II) decanoate, cobalt(II) naphthenate, and mixtures thereof.

* * * * *